United States Patent [19]
Radford

[11] Patent Number: 5,107,942
[45] Date of Patent: Apr. 28, 1992

[54] INNER TUBE STABILIZER FOR A COREBARREL

[75] Inventor: Steven R. Radford, South Jordan, Utah

[73] Assignee: Baker Hughes Incorporated, Houston, Tex.

[21] Appl. No.: 680,302

[22] Filed: Apr. 4, 1991

[51] Int. Cl.$^5$ .................. E21B 17/10; E21B 25/00
[52] U.S. Cl. .................................................. 175/244
[58] Field of Search ............... 175/239, 244, 246, 249, 175/44, 403, 404

[56] References Cited

U.S. PATENT DOCUMENTS

| | | | |
|---|---|---|---|
| 3,095,049 | 6/1963 | Berger | 175/244 |
| 3,504,750 | 4/1970 | Tiraspolsky et al. | 175/244 |
| 3,929,388 | 12/1975 | Sutko et al. | 175/325 |
| 4,484,785 | 11/1984 | Jackson | 175/325 |
| 4,865,138 | 9/1989 | Swietlik | 175/325 |

OTHER PUBLICATIONS

Eastman Christensen Coring Handbook, Publ. 1990; Cover, pp. 4-30/4-31 and 7-26.

Primary Examiner—Stephen J. Novosad
Attorney, Agent, or Firm—Trask, Britt & Rossa

[57] ABSTRACT

A stabilizer bearing assembly is described for maintaining separation between a substantially nonrotating inner tube assembly and a rotating core barrel within which the inner tube assembly is disposed. The bearing assembly comprises a cylindrical tube having a cylindrical sleeve segment concentrically slidably mounted on the tube over an external bearing portion thereof. The tube includes an upper and a lower segment, with the hardened bearing portion over which the sleeve sits being located near the lower end of the upper segment. A flange demarcs the upper edge of the bearing portion. The upper end of the lower tube segment is threadedly attached over the lower end of the upper segment. The sleeve segment is trapped between the flange and the edge of the upper end of the lower tube segment. The inner surface of the sleeve has a plurality of spaced longitudinal furrows and the outer surface of the sleeve has raised ridges corresponding to the furrows. The furrows provide a passage for drilling fluid and debris. The ridges have at their tops flattened bearing surfaces which define an outer circumference whose radius is greater than the radius of the outer circumference of the sleeve segment and the tube. The stabilizer assembly can be detachably inserted between adjacent upper and lower elements of an inner tube assembly. For use, one or more of such stabilizer assemblies would be inserted at spaced intervals in an inner tube assembly.

20 Claims, 3 Drawing Sheets

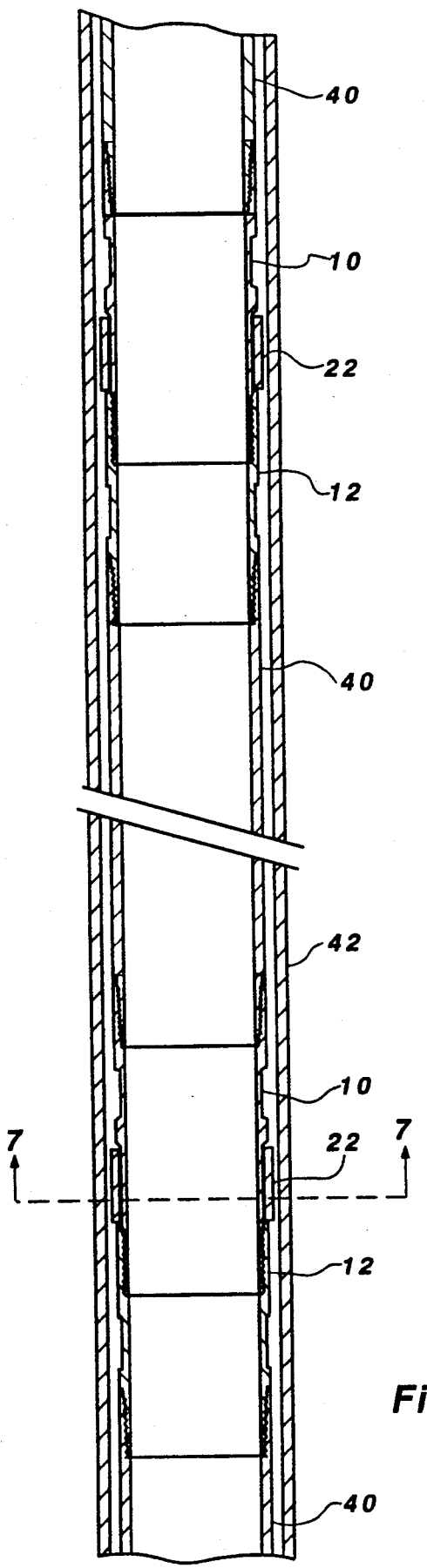
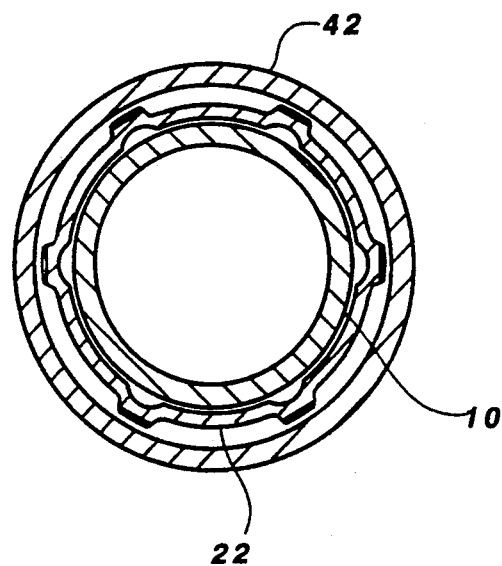
Fig. 6
Fig. 7

INNER TUBE STABILIZER FOR A COREBARREL

BACKGROUND OF THE INVENTION

1. Field

The invention relates to earth drilling apparatus, and more particularly to coring devices.

2. State of the Art

Coring is a commonly used method for gaining information about the rock formations through which drilling is being performed. Apparatus for coring typically includes a cylindrical inner tube which is concentrically disposed within an outer core barrel. A coring bit at the distal end of the core barrel cuts a cylindrical core which is received in the inner tube. The outer core barrel rotates, but the inner tube does not. When coring in drill holes which are horizontal or highly deviated from the vertical, the inner tube may sag against the outer core barrel unless some means is provided for stabilizing the inner tube. Such sagging can cause drag against the rotating outer barrel, and consequent jamming of the core in the inner tube.

Previous devices for stabilizing the inner tube relative to the outer core barrel have typically comprised a bearing with rollers which surrounds the inner tube and fits between the inner tube and the core barrel. However, these have generally had very poor durability. The rollers tend to wear out, and the pins break prematurely, necessitating frequent replacement.

Accordingly, a need remains for a device to stabilize a nonrotating inner core tube with respect to an outer core barrel which is simple, inexpensive, and more durable than those described above.

SUMMARY OF THE INVENTION

A stabilizer bearing assembly for maintaining separation between an adjacent segment of a substantially nonrotating inner tube and a rotating core barrel within which the inner tube is disposed, has been invented. The bearing assembly comprises a cylindrical tube having a cylindrical sleeve segment concentrically slidably mounted thereover on an external bearing surface. The sleeve establishes a minimum separation or standoff between the stabilizer tube and the inner surface of a core barrel within which the stabilizer assembly is concentrically disposed.

The tube can be detachably inserted between adjacent upper and lower segments of an inner tube. For use, a plurality of such stabilizer assemblies would be inserted at spaced intervals between segments of an inner tube disposed within an outer coring barrel.

In a preferred embodiment, the inner surface of the sleeve has a plurality of spaced longitudinal furrows or scallops and the outer surface of the sleeve has raised ridges corresponding to the furrows. The furrows provide a passage for drilling fluid and debris, to prevent the debris from being trapped between the sleeve and the tube. The ridges have at their tops hardened bearing surfaces defining an outer circumference whose radius is greater than the radius of the outer circumference of the sleeve segment and the tube.

In a further preferred embodiment, the tube comprises an upper and a lower segment. The hardened bearing portion over which the sleeve sits is located near the lower end of the upper segment. A flange demarcs the upper edge of the bearing portion. The upper end of the lower tube segment is removably attached over the lower end of the upper segment, for example by means of threaded portions on the ends of the two segments. The sleeve segment is trapped between the flange and the edge of the upper end of the lower tube segment.

BRIEF DESCRIPTION OF THE DRAWINGS

FIG. 6 shows the invented stabilizer assembly in association with adjacent segments of inner tube disposed within an outer core barrel;

FIG. 7 is a cross-section taken along line 7—7 of FIG. 6.

DETAILED DESCRIPTION OF THE ILLUSTRATED EMBODIMENT

Figure 1:
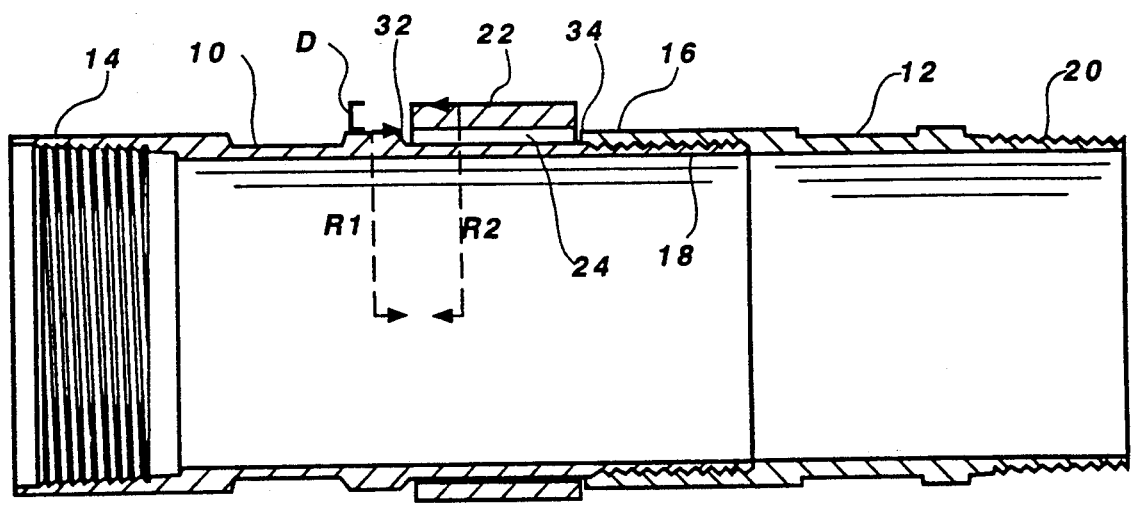
FIG. 1 is a plan view of the bearing assembly.

A stabilizer assembly includes tube segments 10 and 12 having respective internally threaded upper ends 14, 16 and respective externally threaded lower ends 18, 20. Lower end 18 of segment 10 is detachably attached to upper end 16 of segment 12 by means of the corresponding threads. The outermost radius of segment 10 has a length R1. A sleeve segment 22 is concentrically slidably mounted on segment 10 over a bearing portion 24. Bearing portion 24 encircles segment 10 on its outer surface.

Figure 2:
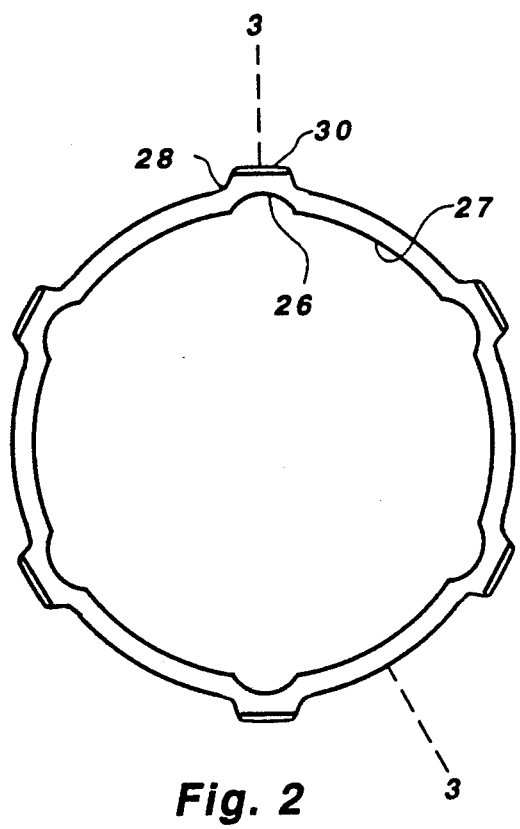
FIG. 2 is a top view of the sleeve segment of the assembly.
Figure 3:
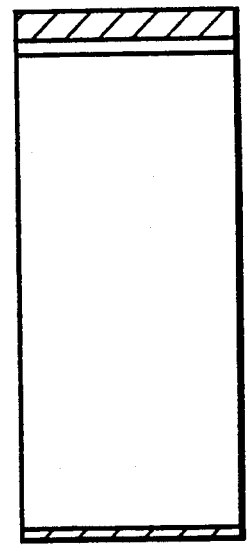
FIG. 3 is a cross-section view of the sleeve segment taken along line 3—3 of FIG. 2.
Figure 4:
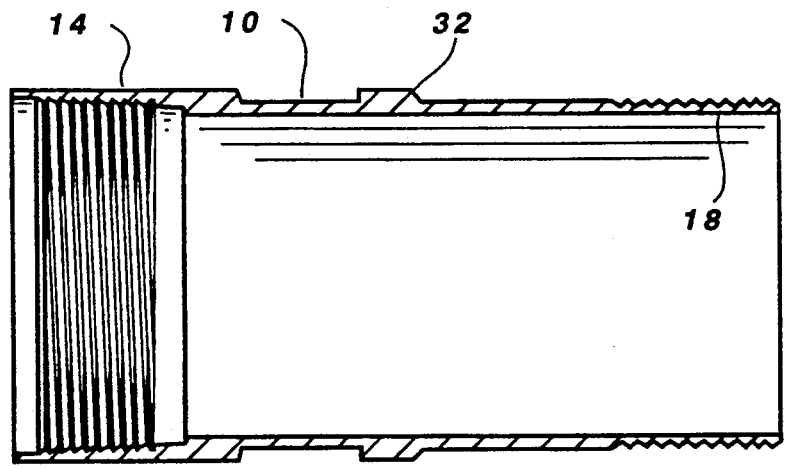
FIG. 4 is a plan view of the upper tube segment of the bearing assembly.

Sleeve segment 22 is provided with a plurality of furrows or scallops 26 on its interior surface, as best seen in FIG. 2. Furrows 26 extend parallel to the concentric longitudinal axis of segments 10, 12 and sleeve segment 22. Furrows 26 allow drilling fluid and debris a channel to pass between sleeve segment 22 and bearing portion 24. The furrows thus prevent debris from building up, jamming, and causing unusual rotational movements. The furrows also direct the drilling fluid between the bearing surfaces 26 and 27 to provide cooling action in preventing frictional heat buildup. A plurality of raised ridges 28 each corresponding to one of furrows 26 extend from the outer surface of sleeve segment 22. Each ridge 28 has a bearing surface 30. Between the ridges, the smaller diameter of the exterior surface of sleeve segment 22 permits unobstructed flow of drilling fluid through the stabilizer assembly to the core bit.

Preferably, bearing surface 24 of segment 10 and bearing surface 27 of segment 22 are made very hard as known in the art, for example by nitriding, quench and tempering, or case hardening. Bearing surfaces 30 of ridges 28 are not hardened, so as to avoid scoring of the inner surface of the surrounding core barrel.

The arcs of all the bearing surfaces 30 define an outer cylinder of radius R2 which is significantly greater than the maximum external radius R1 of segment 10 (FIG. 1). In the illustrated embodiment, R1 of segment 10 is similar to the maximum radius of inner core tube segments which are attached to the stabilizer assembly (FIG. 6). The distance D which is the difference between R1 and R2 establishes the minimum separation between the outer surface of the stabilizer assembly and the inner surface of outer core barrel 42 within which the stabilizer assembly is concentrically disposed. This minimum separation in turn tends to keep adjacent attached segments 40 of the inner core tube from contacting the interior of the surrounding core barrel 42 (FIG. 6).

The illustrated embodiment of sleeve segment 22 includes six furrows with six corresponding ridges (FIG. 2). Each furrow is circumferentially spaced from adjacent furrows by about 60°. Individual furrows are in the form of shallow scallops. However, furrows of different configurations (for example V-shaped), and arrangements having different numbers of furrows and/or other circumferential spacings, are within contemplation.

Figure 5:
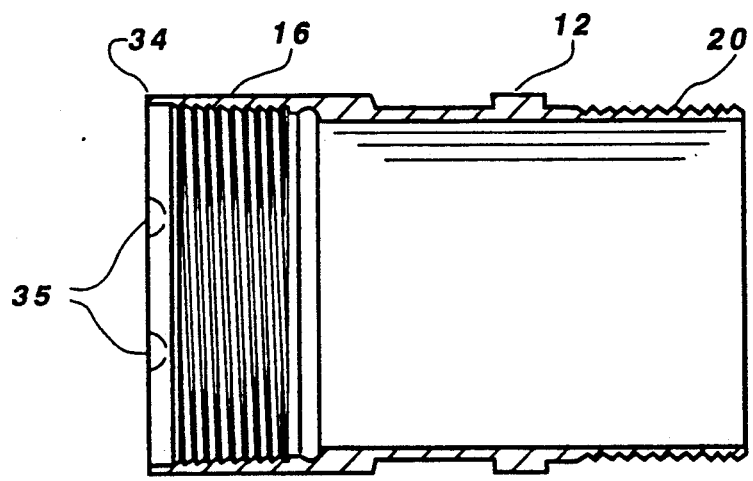
FIG. 5 is a plan view of the lower tube segment of the bearing assembly.
Figure 5A:
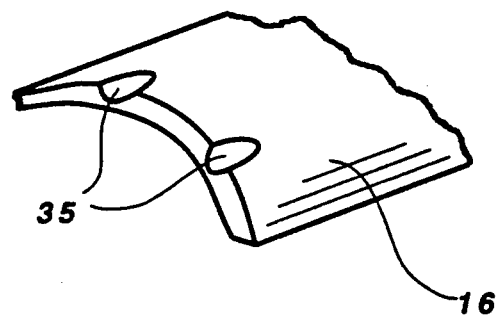
FIG. 5A is an enlarged perspective view of the upper edge of the lower tube segment.

In a preferred embodiment, segment 10 of the assembly is provided with a circumferential flange 32 which abuts the upper edge of bearing portion 24 (FIG. 1). The lower edge of bearing portion 24 is proximate the externally threaded lower end 18. When segment 10 is threadably attached to upper end 16 of segment 12, the edge 34 of upper end 16 constitutes in effect a second flange abutting the lower edge of bearing portion 24. Edge 34 is square shoulder with edge scallops 35 therein (see FIGS. 5 and 5A) to facilitate fluid flow between sleeve 22 and bearing surface 24. Sleeve segment 22 is trapped between flange 32 and edge 34 to ride over bearing portion 24. The preferred detachable arrangement of segments 10 and 12 permits sleeve segment 22 to be readily removed and replaced as required by wear.

Alternatively, segments 10 and 12 could be combined into a single segment having flanges at both the upper and lower edges of bearing portion 24 for trapping sleeve segment 22. Such a single segment could be formed in mating halves and bolted, welded or otherwise secured together about bearing portion 24.

In use, a plurality of stabilizer assemblies are inserted at intervals between segments of an inner tube assembly 40 (FIG. 6). A stabilizer assembly may also be disposed between the lower end of the lowermost inner tube and the sleeve assembly incorporating a core catcher immediately above the core bit. The spacing of individual stabilizer assemblies is determined according to the effectiveness in preventing sagging of the intervening inner core tube segments, which in turn depends upon the inherent structural rigidity of the material of which the inner tube is formed. Inner tubes of fiberglass and aluminum, as currently known and used in the art, are believed to require a stabilizer assembly about every 15 to 30 feet for optimum results. It is contemplated that the stabilizer assembly of the present invention may be disposed at any location and between any adjacent elements of an inner tube assembly. When the core barrel incorporating the stabilizer assembly of the present invention is deployed in a highly deviated drill hole, the weight of the inner tube will cause the stabilizer ridges to contact the interior of the core barrel. The stabilizer sleeve will then rotate with the corebarrel about the stationary inner tube, which is removed from contact with the core barrel interior.

What is claimed is:

1. A stabilizer assembly for maintaining separation between an adjacent segment of a substantially nonrotating inner tube assembly and a rotating core barrel within which the inner tube and stabilizer assembly are disposed, comprising:
    a cylindrical tube having an upper end configured for detachably affixing said tube to an adjacent upper segment of an inner tube assembly element, a lower end configured for detachably affixing said tube to an adjacent lower segment of an inner tube assembly element, and an exterior surface bearing portion encircling said tube; and
    a cylindrical sleeve segment concentrically slidably mounted on said tube over said bearing portion and establishing a minimum separation between said tube and the inner surface of said core barrel.

2. The assembly of claim 1, wherein the interior surface of said sleeve segment has a plurality of radially spaced furrows extending parallel to a longitudinal axis of said sleeve segment, and the exterior surface of said sleeve segment has a plurality of raised ridges corresponding to said furrows, said ridges having bearing surfaces defining an outer circumference whose radius is greater than the radius of the outer circumference of said tube.

3. The assembly of claim 2, wherein the longitudinal midline of an individual said furrow and the longitudinal midline of its corresponding ridge are located on an individual radial plane of said cylindrical tube.

4. The assembly of claim 1, wherein said tube comprises a first upper tube segment having a lower end detachably affixed to an upper end of a second lower tube segment by means of corresponding attachment structures on said upper and lower tube segments.

5. The assembly of claim 4, wherein said bearing portion is near said lower end of said upper tube segment, said upper tube segment further having a flange adjacent an upper edge of said bearing portion, said sleeve segment being trapped between said flange and said upper end of said lower tube segment.

6. The assembly of claim 5, wherein said corresponding attachment structures comprise outer threads on said lower end of said upper tube segment and inner threads on said upper end of said lower tube segment.

7. The assembly of claim 3 wherein said plurality of spaced furrows comprises six furrows spaced radially at sixty degrees.

8. The assembly of claim 7 wherein said furrows have a substantially concave profile.

9. The assembly of claim 2 wherein said upper and lower tube segments and said sleeve segment are composed of a steel alloy, and said bearing portion is selected from the group consisting essentially of case hardened steel, nitrided steel, and quench and tempered steel.

10. A bearing assembly for maintaining separation between the outer surface of an adjacent segment of an inner tube assembly and the inner surface of a core barrel, ,; comprising:
    a cylindrical upper tube segment having an upper end configured for detachably affixing said upper tube to an adjacent upper segment of an inner tube assembly element, a lower end, and an exterior surface bearing portion with a flange adjacent an upper edge, said bearing portion encircling said upper tube segment;
    a cylindrical lower tube segment having an upper end detachably attached to said lower end of said upper tube and a lower end configured for detachably affixing said lower tube to an adjacent lower segment of an inner tube assembly element; and
    a cylindrical sleeve segment slidably mounted on said upper tube over said bearing portion and establishing a minimum separation between said inner tube assembly adjacent said bearing assembly and the inner surface of a core barrel within which said tube segments and sleeve segment are concentrically disposed.

11. The assembly of claim 10, wherein the interior surface of said sleeve segment has a plurality of spaced longitudinal furrows and the exterior surface of said sleeve segment has a plurality of longitudinal raised ridges corresponding to said spaced furrows, said ridges having bearing surfaces defining an outer circumference whose radius is greater than the radius of the outer circumference of said tube segments, said furrows and ridges extending parallel to a longitudinal axis of said sleeve segment.

12. The assembly of claim 10, wherein said sleeve segment is trapped between said flange and said upper end of said lower tube.

13. The assembly of claim 12, wherein said lower end of said upper tube has an external threaded portion, said upper end of said lower tube has an internal threaded portion, and said upper and lower tubes are attached by means of said threaded portions.

14. The assembly of claim 11 wherein said interior surface of said sleeve segment between said furrows defines an inner radius, and the difference between said inner radius and the outer radius of said outer circumference establishes a minimum separation between said tube segments and the inner surface of a core barrel within which said tube segments and said sleeve segment are concentrically disposed.

15. A core drilling assembly comprising:
 a rotatable core barrel having an associated coring bit and adapted to rotate during drilling of a core;
 at least two non-rotating inner tube elements concentrically, disposed within said core barrel; and
 at least one stabilizer segment having an upper end attached to one of said inner tube elements and a lower end attached to another of said inner tube elements, said stabilizer segment comprising
 a cylindrical tube having an upper end configured for detachably affixing said tube to a lower end of one of said inner tube elements, a lower end configured for detachably affixing said tube to an upper end of one of said inner tube elements, and an exterior surface bearing portion encircling said tube; and
 a cylindrical sleeve concentrically rotatably mounted on said tube over said bearing portion and in non-rotatable contact with the inner surface of said core barrel, said sleeve establishing a minimum separation between said tube and said inner surface of said core barrel.

16. The assembly of claim 15, wherein the interior surface of said sleeve has a plurality of radially spaced furrows extending parallel to a longitudinal axis of said sleeve, and the exterior surface of said sleeve has a plurality of raised ridges corresponding to said furrows, said ridges having bearing surfaces defining an outer circumference, the radius of which is greater than the radius of the outer circumference of said tube.

17. The assembly of claim 16, wherein the longitudinal midline of an individual said furrow and the longitudinal midline of its corresponding ridge are located on an individual radial plane of said cylindrical tube.

18. The assembly of claim 15, wherein said tube comprises a first upper tube segment having a lower end detachably affixed to an upper end of a second lower tube segment by means of corresponding attachment structures on said upper and lower tube segments.

19. The assembly of claim 18, wherein said bearing portion is near said lower end of said upper tube segment, said upper tube segment further having a flange adjacent an upper edge of said bearing portion, said sleeve being trapped between said flange and said upper end of said lower tube segment.

20. The assembly of claim 19, wherein said corresponding attachment structures comprise outer threads on said lower end of said upper tube segment and inner threads on said upper end of said lower tube segment.

* * * * *